Oct. 22, 1940.  B. G. EATON  2,218,815
CALCULATOR
Filed July 18, 1939  2 Sheets-Sheet 1
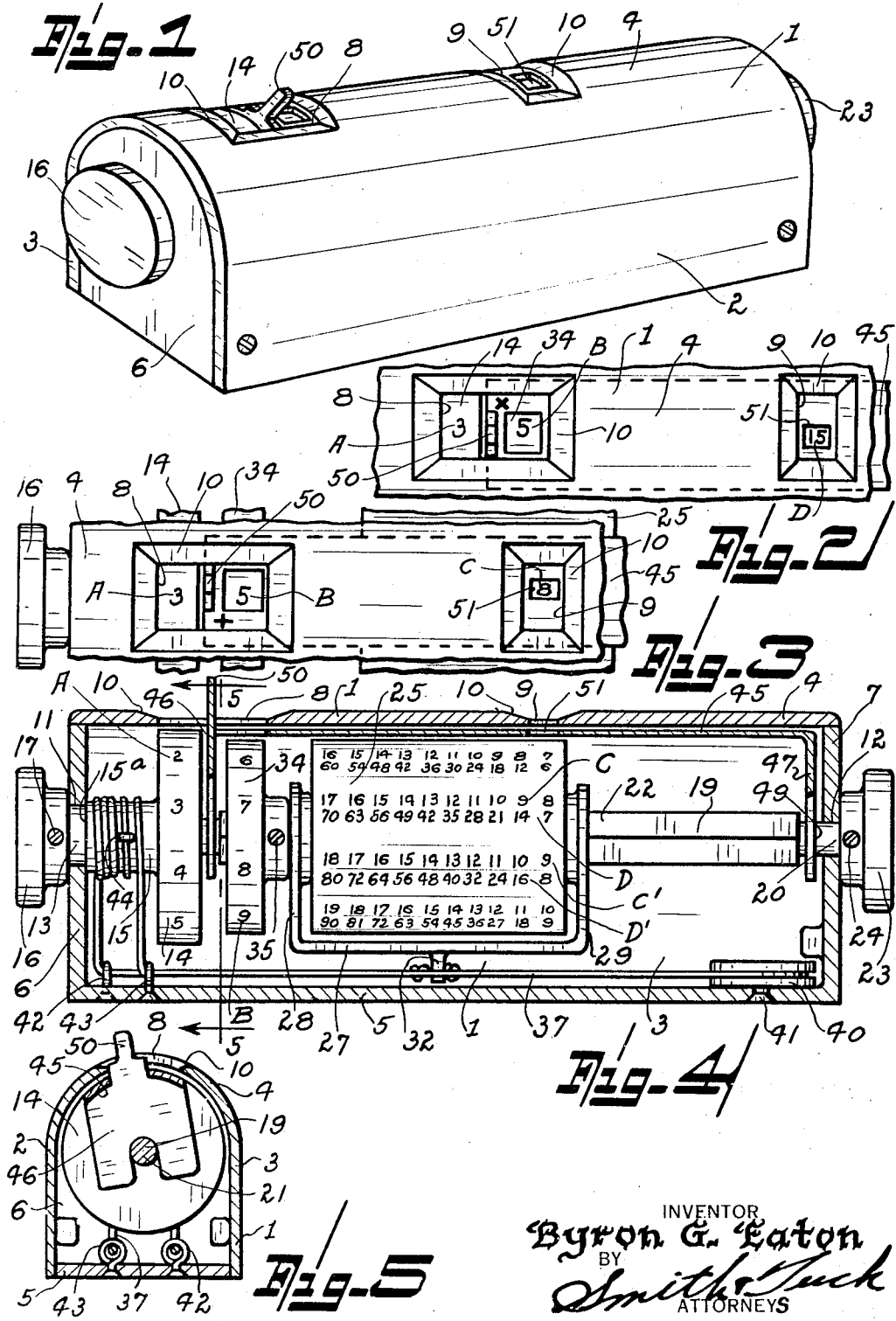
INVENTOR
Byron G. Eaton
BY
Smith Tuck
ATTORNEYS Oct. 22, 1940.  B. G. EATON  2,218,815

CALCULATOR

Filed July 18, 1939  2 Sheets-Sheet 2

INVENTOR
Byron G. Eaton
BY
Smith & Tuck
ATTORNEYS

Patented Oct. 22, 1940

2,218,815

UNITED STATES PATENT OFFICE 2,218,815

CALCULATOR

Byron G. Eaton, Seattle, Wash.

Application July 18, 1939, Serial No. 285,073

5 Claims. (Cl. 235—87)

My present invention relates to an improved calculator of the manually controlled and operated type.

The device of my invention may alternately be employed to calculate the answers of problems in multiplication or addition and while, as shown, the limit of its calculating is 9 times 10, or 9 plus 10, the series of numerals may be increased by increasing the size of the machine.

Generally, my calculator consists of a rotating drum with numerals spaced peripherally thereon in series, and a pair of disks one rotatable and one nonrotatable except with the drum each of the disks having series of numerals thereon which when properly selected will present a problem which will be answered by the drum indicia.

In the accompanying drawings I have illustrated one complete example of a physical embodiment of my invention according to the best mode I have thus far devised, but it will be understood that changes and alterations may be made in the exemplified structure without departing from the spirit of the appended claims.

In the drawings, Figure 1 is a perspective view of the calculator showing a control knob, the selector lever and the apertures.

Figure 2 is a partial top plan view showing the two apertures and disks in the multiplication problem position.

Figure 3 is a partial top plan view showing the two apertures and disks in the addition problem position.

Figure 4 is a front vertical sectional view showing the parts in their related position.

Figure 5 is a transverse sectional view along the line 5—5 of Figure 4.

Figure 6:
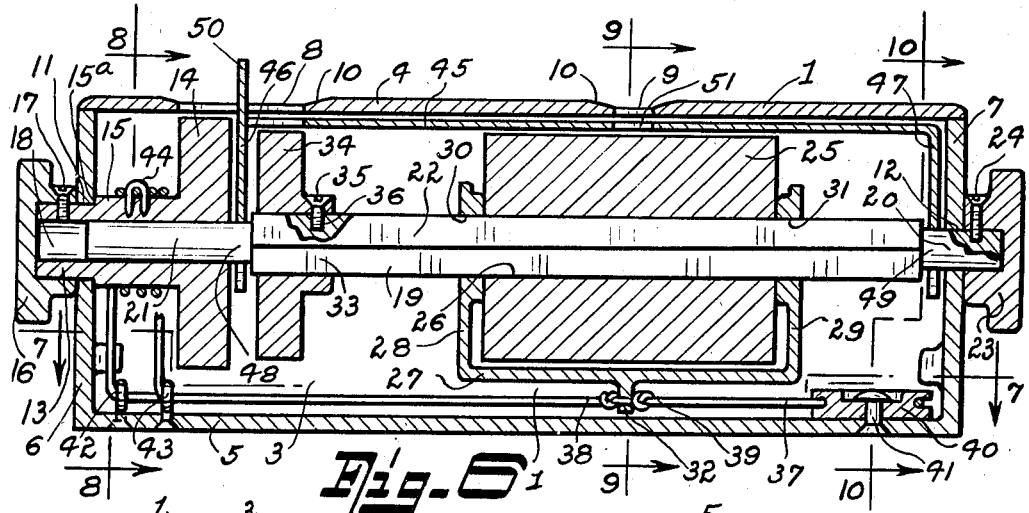
Figure 6 is a vertical sectional view similar to Figure 4, but showing in more detail the parts of the calculator.
Figure 7:
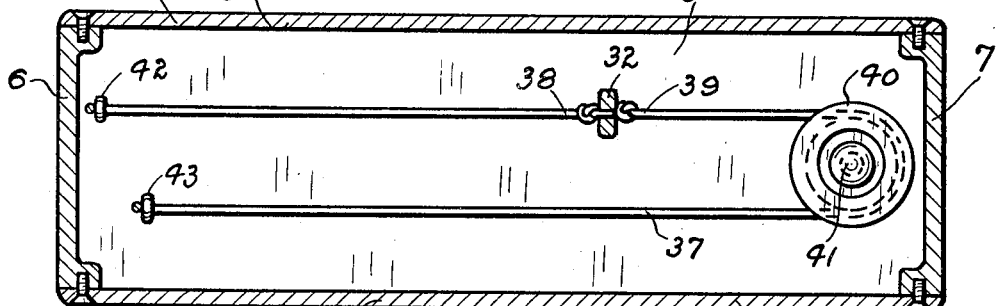
Figure 7 is a top view along the line 7—7 of Figure 6.
Figure 8:
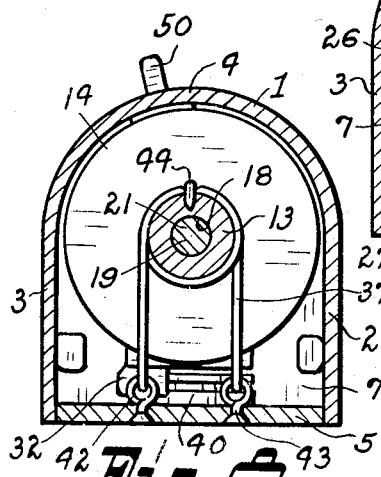
Figure 8 is a view along line 8—8 of Figure 6.
Figure 9:
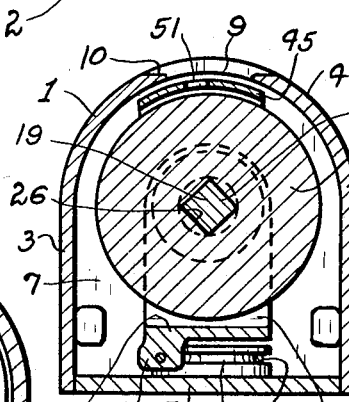
Figure 9 is a view along line 9—9 of Figure 6.
Figure 10:
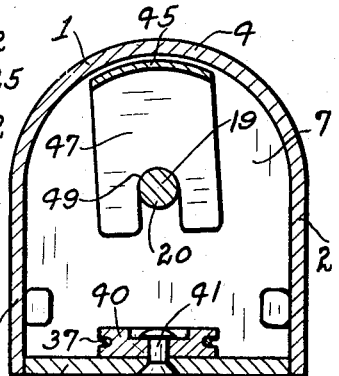
Figure 10 is a view along line 10—10 of Figure 6.

Referring now to the drawings my calculator includes a housing 1 having front wall 2 and rear wall 3, and a semi-cylindrical top 4. The base 5 has upturned ends 6 and 7 adapted to fit into the housing and form end closures therefor.

In the top portion 4 of the housing, I form apertures 8 and 9 said apertures being aligned with each other and aperture 8 being of greater width than aperture 9. The edges of the apertures are beveled as at 10 to provide maximum visibility from different angles of view.

Each of the ends 6 and 7 are provided with aligned openings 11 and 12 forming axle bearings.

Within the bearing 11 is journaled the axle 13 of the disk 14 having an annular offset portion 15 formed by shoulder 15a and adapted to abut the inner wall of the housing end 6 to space the disk 14 therefrom. Exterior of the housing end 6, the axle 13 is provided with a knob 16 rigid therewith and secured in position by set screw 17.

The axle 13 is of tubular construction having a hollow bore 18. Also within the housing I employ the axle 19 having the cylindrical ends 20 and 21 and the squared or rectangular intermediate portion 22. The end 20 of the axle 19 is journaled in the bearing 12 in the housing end 7 while the opposite end 21 of the axle 19 is journaled in the hollow bore 18 of the disk 14. Exterior of the housing end 7 the axle end 20 is provided with a knob 23 secured thereon by means of the set screw 24.

Mounted on the squared intermediate portion 22 of the shaft 19 I have mounted my calculator drum 25, by means of its square bore 26 adapted to fit tightly on the axle 19. This drum may be fashioned of wood, plastic or other material and has thereon series of figures as will be hereinafter more fully described.

The drum 25 is adapted to slide longitudinally of the shaft 22 and the drive means therefor includes a U-shaped yoke 27 the ends 28 and 29 of which have round supporting bearings 30 and 31 permitting the yoke to rest freely on the shaft. Central of the longitudinal or base portion of the yoke, I provide a depending lug 32 by means of which the yoke and the drum are shifted along the axle 22.

At the end 33 of the portion 22 of the axle 19, a second disk 34 is secured and maintained in place on the shaft by a set screw 35 threadedly engaging a hole 36 in the shaft.

Rotating and sliding the various parts including the disk 14, and the drum 25 I utilize a flexible cord or other drive means as 37. The ends 38 and 39 of the cord are secured to the lug 32 on the yoke and the cord from its end 39 is wound one turn around the pulley 40 secured on the base 5 by the rivet 41. The cord from the ends 38 and 39 is passed through the eyelets 42 and 43 respectively in the base 5 and is then wound around the offset portion 15 of the disk axle in several turns, and one revolution is secured to the offset portion by means of a staple 44.

Thus when the knob 16 is rotated the disk 14 and its axle are rotated. The cord wound around the axle is wound at one side and unwound at the other to move the yoke 27 along the axle 22. The drum 25 being between the ends of the yoke is, of course, moved with the yoke.

When the knob 23 is rotated, the drum and the disk 34 are simultaneously rotated therewith.

Also on the shaft 19, I provide a yoke selector bar 45 having right angular ends 46 and 47 journaled on the cylindrical portions of the shaft 19 at 48 and 49. A lever portion 50 of the bar adjacent the end 46 stands vertically and extends through the aperture 8. By moving the lever, the selector bar may be shifted on the shaft 19 within the limit of movement afforded by the aperture 8. This bar is provided with an opening 51 aligned with the aperture 9, but about one-half the size thereof. Visible through the aperture 8 are the plus and times signs on the bar.

Having thus described the mechanical construction and operation of my calculator, I now proceed to the calculator indicia on the disks and the drum.

The disk 14 is provided with a series A of numbers from 1 through 10 on the periphery thereof, the series so placed as to be selectively visible through the left hand portion of the aperture 8 as divided by the lever 50.

The disk 34 also has a series of numbers B on the periphery thereof from 1 through 9 the series adapted to be selectively visible through the right hand portion of the aperture 8 as divided by the lever 50.

The drum 25 has thereon spaced series of double rows C—D of numbers from 1 through 90. The upper row of each series contains 10 numbers in inverse order and each series starts with a number next higher than the starting number in the corresponding row above. For instance, referring to Figure 4, the row C contains the numbers from 17 through 8 and the row C' contains the numbers 18 through 9. The rows of the C designation contain the answers to the problem when the lever 50 is placed at the plus sign on the bar 45.

The rows D contain series of 10 numbers in the multiple of the first or lowest number in the row and each row starts at the right in Figure 4 with a number next consecutively higher than the number in the preceding D row. The row D contains the numbers 7 through 70 and the row D' contains the numbers 8 through 80.

In operation, as illustrated by Figures 2, 3, and 4, when the lever 50 is placed next to the times sign and the number 3 on disk 14 is selected by rotation of the knob 16 while number 5 is selected on the disk 34 by rotation of the knob 23, the answer 15 will appear in the aperture 9. If the lever 50 is moved to the plus sign on the bar 45 with its opening therein the number 15 will be covered and the sum 8 of the numbers selected will be visible.

The disks 14 and 34 are, as stated, independently rotatable and any combination of numbers up to that, highest or lowest on each disk may be selected, and the problem may be chosen in either addition or multiplication.

As the disk 14 is rotated to select a number, the drum 25 is moved longitudinally to place the proper answer row in position below the aperture 9 and by rotating the knob 23, any combination with the numbers selected on the disk 14, is available.

Having thus fully described my invention, what I claim as new and desire to secure by Letters Patent is:

1. In a calculator, the combination with a housing, of a selector disk having an axle journaled in the housing, a second disk having an axle one end of which is journaled in the housing and the other end of which is journaled in the first disk, a drum on the latter axle rotatable with the second disk, means for moving the drum longitudinally of the axle, when the first disk is rotated, and means for rotating the second disk.

2. In a calculator, the combination with a housing, of a selector disk having an axle journaled in the housing, a second selector disk having an axle one end of which is journaled in the housing and the other end of which is journaled in the first disk, a drum on, and rotatable with, the latter axle, a drum driving yoke slidable on the axle and in non-rotatable engagement with the axle, the legs of said yoke straddling said drum, means for moving the yoke, and means for rotating the second disk.

3. In a calculator, the combination with a housing, of a selector disk having an axle journaled in the housing, a second selector disk having an axle one end of which is journaled in the housing and the other end of which is journaled in the first disk, a drum on, and rotatable with, the latter axle, a driving yoke slidable on the axle and in non-rotatable engagement therewith, a drive cord in power transmitting relation with the first disk and the yoke whereby rotation of the first disk will move the drum longitudinally, and means for rotating the second disk.

4. In a calculator, the combination with a housing having a pair of spaced apertures, of rotatable selector disks in the housing visible through one of said apertures, and a drum rotatable with one disk and reciprocable under control of the other disk, said drum having indicia comprising problem answers thereon and means for selecting an answer corresponding to the selected problem for presentation to the other aperture.

5. In a calculator, the combination with a housing having a pair of spaced apertures, of rotatable selector disks in the housing having indicia visible through one of said apertures, and a drum rotatable with one disk and reciprocable under control of the other disk and said disks having selective indicia thereon co-acting to form a problem, said drum having series of numbers thereon comprising answers to the problems, and means for selecting the series on the drum to present the answer to the other aperture.

BYRON G. EATON.